(12) United States Patent
Kang et al.

(10) Patent No.: US 10,366,221 B2
(45) Date of Patent: Jul. 30, 2019

(54) DONGLE APPARATUS AND METHOD OF CONTROLLING THE SAME

(71) Applicant: Samsung Electronics Co., Ltd, Gyeonggi-do (KR)

(72) Inventors: Hee Jun Kang, Gyeonggi-do (KR); Jong Won Park, Gyeonggi-do (KR); Jin Kyoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 15/436,728

(22) Filed: Feb. 17, 2017

(65) Prior Publication Data

US 2017/0242996 A1 Aug. 24, 2017

Related U.S. Application Data

(60) Provisional application No. 62/297,637, filed on Feb. 19, 2016.

(30) Foreign Application Priority Data

Jan. 26, 2017 (KR) ........................ 10-2017-0012424

(51) Int. Cl.
  *G06F 21/34* (2013.01)
  *G06F 13/10* (2006.01)
  *G06F 8/65* (2018.01)

(52) U.S. Cl.
  CPC ................. *G06F 21/34* (2013.01); *G06F 8/65* (2013.01); *G06F 13/102* (2013.01)

(58) Field of Classification Search
  CPC .......... G06F 21/34; G06F 28/65; G06F 13/10; G06Q 2220/14; G06Q 20/3672; H04L 63/0853

(Continued)

(56) References Cited

U.S. PATENT DOCUMENTS 7,660,346 B1 * 2/2010 Klissner ................ G06F 13/385
  375/219
2002/0081993 A1 6/2002 Toyoshima
(Continued)

FOREIGN PATENT DOCUMENTS

CN 101030176 A * 9/2007
EP 2213039 A1 8/2010
(Continued)

OTHER PUBLICATIONS

ISA/KR, "International Search Report," Application No. PCT/KR2017/001748, dated May 23, 2017, Korean Intellectual Property Office, Korea, 3 pages.

(Continued)

*Primary Examiner* — Saleh Najjar
*Assistant Examiner* — Khalid M Almaghayreh

(57) ABSTRACT

Disclosed are a dongle apparatus and a method of controlling the same. The dongle apparatus includes a fastener that combines or separates the dongle apparatus with or from a home appliance, a power supply that receives at least one of a plurality of ranges of power from the home appliance, a power converter that converts the power into available power, a locker that locks the fastener so that the fastener does not separate from the home appliance or unlocks the fastener to separate therefrom, and a controller that receives the available power and controls the locker to lock or unlock the fastener.

19 Claims, 13 Drawing Sheets

(58) Field of Classification Search
USPC .......... 726/9, 20; 705/55, 66, 906; 710/313, 710/305, 62; 713/172
See application file for complete search history.

(56) References Cited

U.S. PATENT DOCUMENTS

| | | |
|---|---|---|
| 2002/0085530 A1 | 7/2002 | Toyoshima |
| 2002/0087759 A1 | 7/2002 | Toyoshima |
| 2004/0003150 A1 | 1/2004 | Deguchi |
| 2004/0034603 A1* | 2/2004 | Hastings .................. G06F 21/34 705/63 |
| 2005/0109841 A1 | 5/2005 | Ryan et al. |
| 2006/0072489 A1 | 4/2006 | Toyoshima |
| 2008/0064237 A1 | 3/2008 | Tan |
| 2008/0108388 A1 | 5/2008 | Ebrom et al. |
| 2008/0122648 A1 | 5/2008 | Ebrom et al. |
| 2008/0123557 A1 | 5/2008 | Elston et al. |
| 2008/0125911 A1 | 5/2008 | Ebrom et al. |
| 2008/0143489 A1 | 6/2008 | Castaldo et al. |
| 2008/0164227 A1 | 7/2008 | LeClear et al. |
| 2008/0287121 A1 | 11/2008 | Ebrom et al. |
| 2009/0100153 A1 | 4/2009 | Ebrom et al. |
| 2009/0103535 A1 | 4/2009 | McCoy et al. |
| 2009/0132070 A1 | 5/2009 | Ebrom et al. |
| 2010/0017781 A1 | 1/2010 | Schwarz et al. |
| 2010/0040873 A1 | 2/2010 | Kohiki et al. |
| 2010/0049831 A1 | 2/2010 | Toyoshima |
| 2010/0102076 A1 | 4/2010 | Hendrickson et al. |
| 2010/0125364 A1 | 5/2010 | Ebrom et al. |
| 2010/0161082 A1 | 6/2010 | Ebrom et al. |
| 2010/0286801 A1 | 11/2010 | Yum et al. |
| 2010/0332164 A1 | 12/2010 | Aisa et al. |
| 2011/0146328 A1 | 6/2011 | Hendrickson et al. |
| 2011/0148223 A1 | 6/2011 | McCoy |
| 2011/0264245 A1 | 10/2011 | Lim et al. |
| 2012/0019361 A1* | 1/2012 | Ben Ayed ............... G06F 21/32 340/5.83 |
| 2012/0019378 A1 | 1/2012 | Watson et al. |
| 2012/0156993 A1* | 6/2012 | Seo ..................... G06F 13/4045 455/41.1 |
| 2012/0173857 A1 | 7/2012 | Kobraei et al. |
| 2013/0016470 A1* | 1/2013 | Kacin .................. G06F 21/105 361/679.31 |
| 2013/0019316 A1* | 1/2013 | Kacin ..................... G06F 21/10 726/26 |
| 2013/0067534 A1* | 3/2013 | Soffer .................. G06F 3/0227 726/2 |
| 2013/0282928 A1 | 10/2013 | Winestein et al. |
| 2014/0018055 A1 | 1/2014 | Majewski |
| 2014/0051372 A1 | 2/2014 | Shoshan et al. |
| 2014/0074296 A1 | 3/2014 | Yum et al. |
| 2014/0087579 A1* | 3/2014 | Chen .................. H01R 13/6275 439/345 |
| 2014/0142730 A1 | 5/2014 | Kim |
| 2014/0148967 A1 | 5/2014 | Bayfus |
| 2014/0250247 A1* | 9/2014 | Yang ........................ G06F 3/06 710/74 |
| 2014/0254800 A1 | 9/2014 | Derby |
| 2014/0300450 A1 | 10/2014 | Ha et al. |
| 2014/0372619 A1 | 12/2014 | Park et al. |
| 2015/0016472 A1 | 1/2015 | Krzyanowski et al. |
| 2015/0020189 A1* | 1/2015 | Soffer ..................... G06F 21/85 726/16 |
| 2015/0026768 A1 | 1/2015 | Wu |
| 2016/0087933 A1* | 3/2016 | Johnson .................. H04W 4/70 709/245 |
| 2016/0112262 A1* | 4/2016 | Johnson .............. G06F 9/45504 709/221 |
| 2017/0272316 A1* | 9/2017 | Johnson ................ H04L 61/301 |

FOREIGN PATENT DOCUMENTS

| | | |
|---|---|---|
| EP | 2213047 A2 | 8/2010 |
| EP | 2244443 A1 | 10/2010 |
| KR | 1020060077276 | 7/2006 |
| KR | 1020080055527 | 6/2008 |
| KR | 1020100131925 | 12/2010 |
| KR | 1020110023245 | 3/2011 |
| KR | 1020110117562 | 10/2011 |
| KR | 1020140006584 | 1/2014 |
| KR | 101579470 | 12/2015 |
| WO | 2006135758 A1 | 12/2006 |
| WO | 2012039897 A1 | 3/2012 |

OTHER PUBLICATIONS

Supplementary European Search Report dated Sep. 11, 2018 in connection with European Patent Application No. 17 75 3500, 9 pages.

* cited by examiner

FIG.10
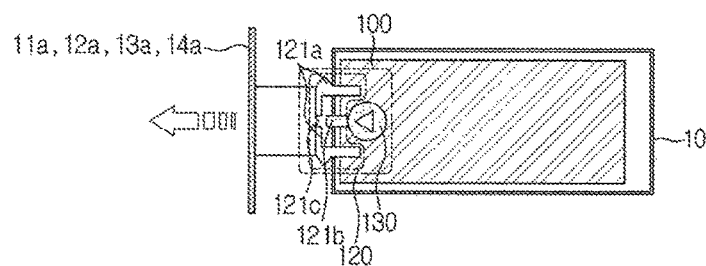
FIG. 10A
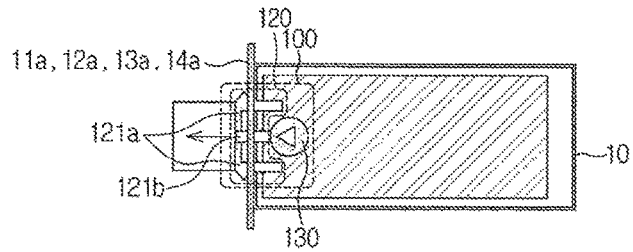
FIG. 10B
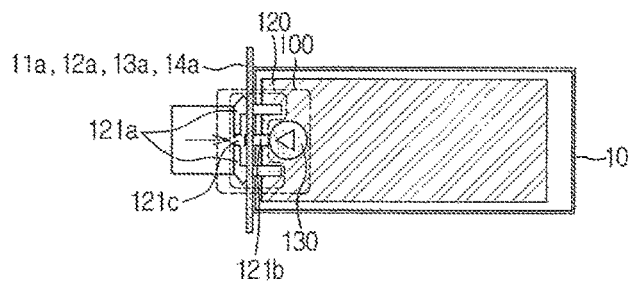
FIG. 10C
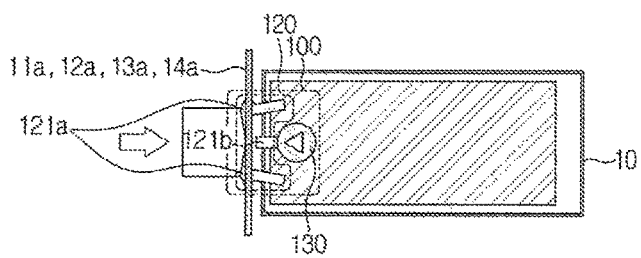
FIG. 10D

FIG.11
FIG. 11A
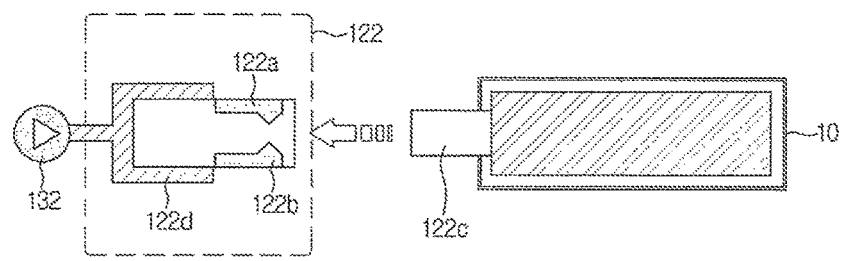
FIG. 11B
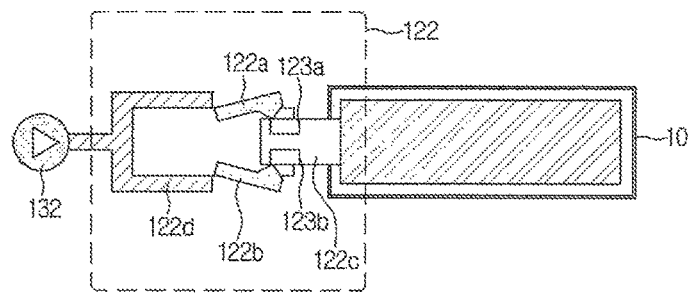
FIG. 11C
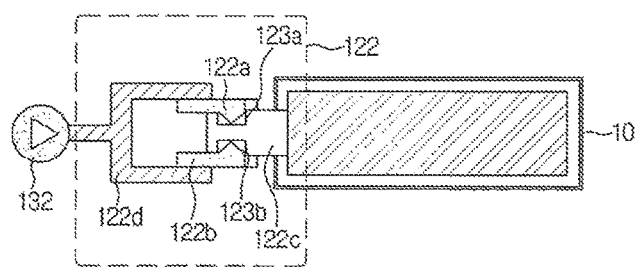
FIG. 11D
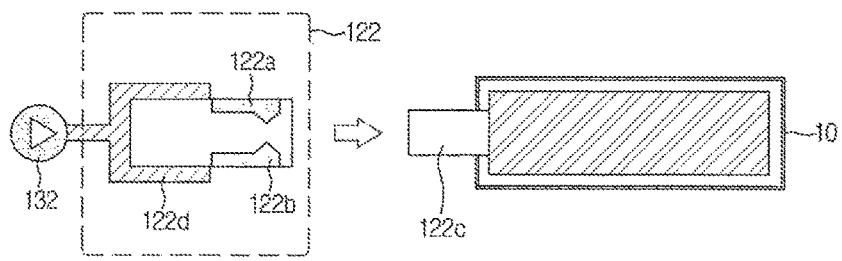

DONGLE APPARATUS AND METHOD OF CONTROLLING THE SAME

CROSS-REFERENCE TO RELATED APPLICATION(S) AND CLAIM OF PRIORITY

The present application is related to and claims the benefit of U.S. Provisional Application No. 62/297,637, filed on Feb. 19, 2016, and Korean Patent Application No. 10-2017-0012424, filed on Jan. 26, 2017 in the Korean Intellectual Property Office, each of which is incorporated herein by reference in its entirety.

TECHNICAL FIELD

Embodiments of the present disclosure relate to a dongle apparatus and a method of controlling the same.

BACKGROUND

A dongle apparatus refers to an apparatus that is connected to an input/output port of a computer and stores a security key or ID to allow only an authenticated user to use the computer when copying or executing a particular program. In other words, the dongle apparatus is small-sized hardware that accesses a computer, is portable such as a universal serial bus (USB) and a flash drive, and was initially used for authenticating computer software but has recently been used as a broadband adaptor.

Accordingly, recently, a USB or an external peripheral apparatus connected to a USB port to support a Bluetooth™ function is referred to as a dongle apparatus. Such dongle apparatus can be connected to a home appliance and be used as a wireless network apparatus capable of wirelessly communicating with other external apparatuses using wireless fidelity (Wi-Fi™), Bluetooth™, Zigbee™ and the like.

Also, such dongle apparatus can be connected to a home appliance, can receive power from the home appliance to update software of the home appliance, or can become a wireless communication module when the home appliance does not include a wireless communication module. However, since each home appliance can have a different output power that is supplied to the dongle apparatus, power compatibility between the home appliance and the dongle apparatus is necessary.

SUMMARY

To address the above-discussed deficiencies, it is an object to provide a dongle apparatus configured to convert power in a plurality of ranges received from a home appliance into available power and a method of controlling the same.

It is another aspect of the present disclosure to provide a dongle apparatus configured to physically combine with a home appliance using a converted available power to update software of the home appliance or to allow the home appliance to wirelessly communicate with an external apparatus and a method of controlling the same.

Additional aspects of the present disclosure will be set forth in part in the description which follows and, in part, will be obvious from the description, or can be learned by practice of the present disclosure.

Provided are a dongle apparatus and a method of controlling the same.

Disclosed are a dongle apparatus and a method of controlling the same. An embodiment of the dongle apparatus includes a fastener configured to combine or separate the dongle apparatus with or from a home appliance, a power supply configured to receive at least one of a plurality of ranges of power from the home appliance, a power converter configured to convert the power into available power, a locker configured to lock the fastener so that the fastener does not separate from the home appliance or unlocking the fastener to separate therefrom, and a controller configured to receive the available power and control the fastener to be locked or unlocked.

In one example, the at least one of the plurality of ranges of power can include a range of 4.5 V to 16 V.

An example of the available power can include 3.3 V power.

Examples of the power converter can include a direct current (DC)-DC converter that receives and converts DC power into another DC power.

The fastener can be formed in at least one of the home appliance and the dongle apparatus.

Embodiments of the fastener can include two first fixers that are spaced apart from each other and have a groove formed therebetween. A second fixer is located in the groove between the two first fixers to fix the two first fixers relative to each other.

The controller can determine whether an update of software of at least one of the home appliance and the dongle apparatus is started or finished by receiving the available power and can controlling the locker to lock or unlock the fastener depending on whether an electrical control signal is transmitted between the home appliance and the dongle apparatus.

Embodiments of the controller can control the locker to lock the fastener when it is determined that the home appliance and the dongle apparatus are combined and the update of software corresponding to at least one of the home appliance and the dongle apparatus is started.

Examples of controlling the locker to lock the fastener can include receiving an electrical control signal from the controller and moving the second fixer in the groove between the two first fixers so that the home appliance and the dongle apparatus do not separate.

In one version, the controller can controls the locker to unlock the fastener when it is determined that the home appliance and the dongle apparatus are combined and an update of software corresponding to at least one of the home appliance and the dongle apparatus is finished.

In another version, controlling the locker to unlock the fastener can includes receiving an electrical control signal from the controller and physically moving the second fixer in the groove between the two first fixers to an original position thereof to separate the home appliance and the dongle apparatus.

It is another aspect of the present disclosure to provide a method of controlling a dongle apparatus, including combining with a home appliance with the dongle apparatus through a fastener, receiving at least one of a plurality of ranges of power from the home appliance, converting the power into available power, and receiving the available power and locking or unlocking the fastener.

The at least one of the plurality of ranges of power can include at least a portion of the range of 4.5 V to 16 V.

One version of the available power can includes 3.3 V power.

The converting of the at least one of the plurality of ranges of power into the available power can includes converting the at least one of the plurality of ranges of power into the available power using a DC-DC converter configured to receive and convert DC power into another DC power.

The fastener can includes two spaced apart first fixers having a groove formed therebetween and a second fixer inserted into the groove between the two first fixers to fix the two first fixers.

The receiving of the available power and controlling the fastener to lock or unlock can include determining whether an update of software corresponding to at least one of the home appliance and the dongle apparatus is started and controlling the fastener to lock when it is determined that the update of the software is started.

The controlling the fastener to lock can include moving the second fixer in the groove between the two first fixers so that the home appliance and the dongle apparatus do not separate.

Receiving the available power and controlling the fastener to unlock or unlock can include determining whether the update of software corresponding to at least one of the home appliance and the dongle apparatus is finished and controlling the fastener to unlock when it is determined that the update of the software is finished.

Controlling the fastener to unlock can include physically moving the second fixer in the groove between the two first fixers to an original position thereof to separate the home appliance and the dongle apparatus.

Before undertaking the DETAILED DESCRIPTION below, it can be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A to 10D are sectional side views illustrating an operation process of a separation preventer included in the dongle apparatus in accordance with one embodiment;

FIGS. 11A to 11D are sectional side views illustrating an operation process of a separation preventer included in a home appliance in accordance with one embodiment;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged electronic device.

Hereinafter, a dongle apparatus and a method of controlling the same will be described with reference to FIGS. 1 to 13.

Figure 1:
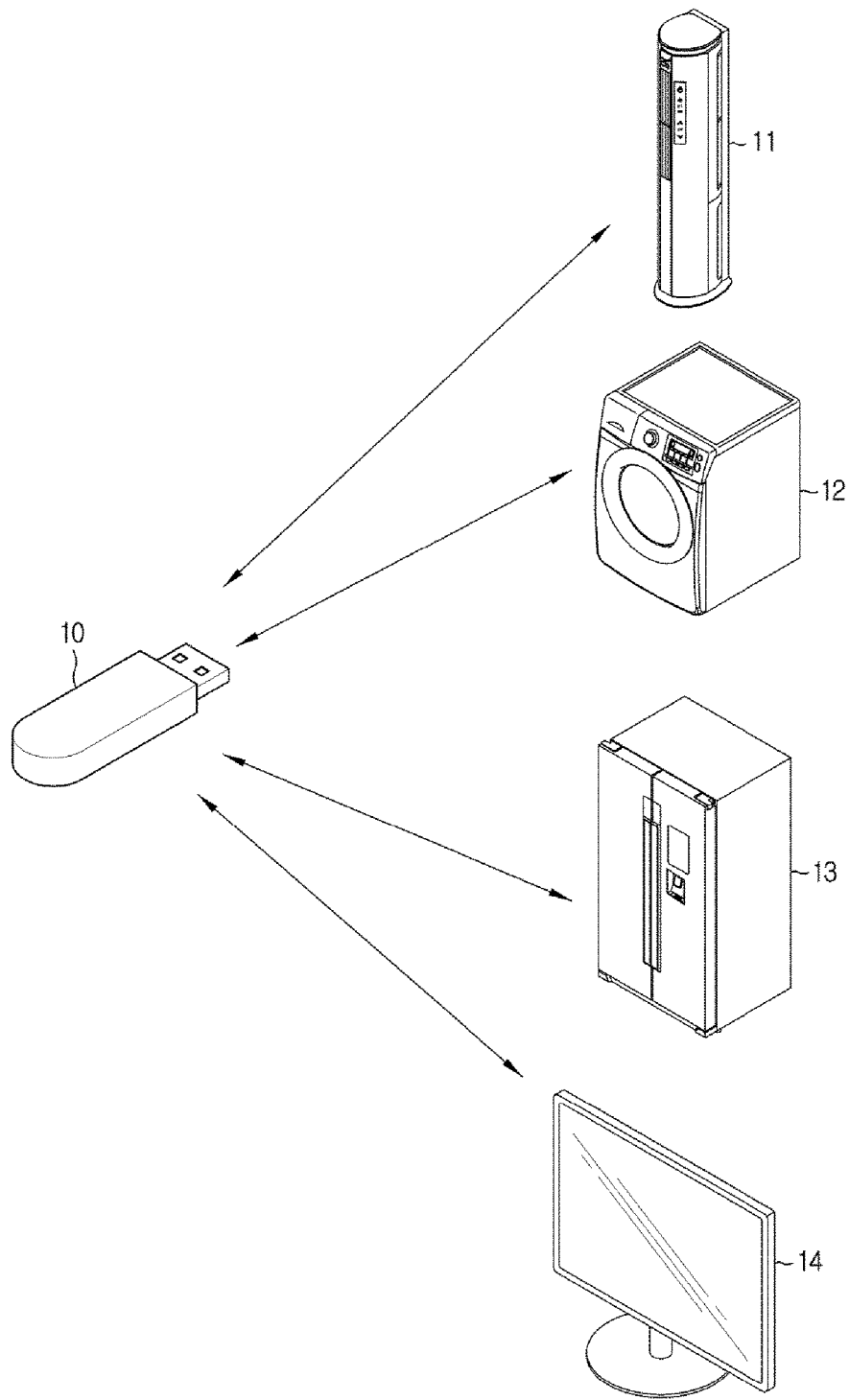
FIG. 1 is an isometric view of a home appliance wireless communication system in accordance with one embodiment.

FIG. 1 is a view of a home appliance wireless communication system in accordance with one embodiment.

A home appliance wireless communication system 1 refers to a system configured to wirelessly communicate with at least one of an external apparatus and an external server using a communication module included in at least one of a plurality of home appliances 11 to 14 or a dongle apparatus 10 configured to be physically connectable to at least one of the plurality of home appliances 11 to 14 and to be capable of wireless communication.

The at least one of the plurality of home appliances 11 to 14 connected to the dongle apparatus 10 can update software by wirelessly communicating with the at least one of the external apparatus and the external sever and transmitting and receiving data therewith using the home appliance wireless communication system 1.

The home appliance wireless communication system 1 can include the dongle apparatus 10 and the plurality of home appliances 11 to 14.

Here, the dongle apparatus 10 refers to an external connection apparatus configured to enable wireless communication with the at least one of the external apparatus and the external server when the external connection apparatus is connected to the plurality of home appliances 11 to 14 even though a communication module is not present in the plurality of home appliances 11 to 14. That is, the dongle apparatus 10 can function as a communication module of a home appliance when the dongle apparatus 10 is connected to the home appliance.

Accordingly, the dongle apparatus 10 can include at least one of a Bluetooth™ module, a wireless fidelity (Wi-Fi™) module, a Zigbee™ module, an infrared (IR) communication module, and a wireless local area network (LAN) module, and can allow the connected home appliance to wirelessly communicate with the at least one of the external apparatus and the external server using one of such modules.

The home appliance can download or update software of the home appliance by wirelessly communicating with the outside using the dongle apparatus 10.

Also, the dongle apparatus 10 can be connected to a physically connectable connection port included in each of the plurality of home appliances 11 to 14.

The physically connectable connection port can be a universal serial bus (USB) port and the like. The dongle apparatus 10 can be physically combined with the home appliance through the connection port included in the plurality of home appliances 11 to 14, and can receive power from the home appliance.

Also, the dongle apparatus 10 can convert the power supplied from the home appliance into power compatible with the dongle apparatus 10. Here, the power compatible with the dongle apparatus 10 refers to power necessary for driving and controlling the dongle apparatus and is defined as available power.

The dongle apparatus 10 can receive at least one of a plurality of ranges of power from the physically connected home appliance.

It is necessary for the dongle apparatus 10 to convert any range of power into the power compatible with the dongle apparatus 10 when receiving power supplied from the connected home appliance. This is because power supplied from each home appliance can be differently set when the home appliance was designed or can be different depending on user settings, and it is necessary to apply one dongle apparatus 10 to all home appliances.

Also, the dongle apparatus 10 can be physically combined with the home appliance through the connection port included in the plurality of home appliances 11 to 14, and can allow the home appliance to wirelessly communicate with the at least one of the external apparatus and the external server through the communication module in the dongle apparatus 10.

Also, when updating the software of the home appliance, the dongle apparatus 10 can determine whether the update is started or finished, and can not allow the physical combination between the dongle apparatus 10 and the home appliance to be separated until a started update is finished based thereon. Through this, it is possible to more stably update the software of the home appliance.

The plurality of home appliances 11 to 14 can include an air-conditioner 11, a washing machine 12, a refrigerator 13, and a television (TV) 14. However, the home appliances described above are merely examples of the plurality of home appliances 11 to 14 and the plurality of home appliances 11 to 14 are not limited thereto, and can include any home appliance to which the dongle apparatus 10 is connectable.

Also, the plurality of home appliances 11 to 14 can include first to fourth connection ports 11a to 14a to which the dongle apparatus 10 is physically connectable.

Generally, the plurality of home appliances 11 to 14 can include communication modules capable of wireless communication. However, a case in which communication modules are not included to reduce manufacturing costs during a process of producing the plurality of home appliances 11 to 14 can exist. In this case, an additional communication module is necessary for the plurality of home appliances 11 to 14 to communicate, and the dongle apparatus 10 for performing wireless communication can be used therefor.

Also, at least one of the plurality of home appliances 11 to 14 can be connected to the dongle apparatus 10 through the connection port and can supply power to the dongle apparatus 10 through a power supply (not shown).

Also, the plurality of home appliances 11 to 14 can download new software or can update existing software by communicating through a method of transmitting and receiving data with at least one of the external apparatus and the external server through the connected dongle apparatus 10.

Here, during a process of downloading new software or updating existing software, when a physical combination state between the dongle apparatus 10 and the home appliance is released, the software of the home appliance can not operate or can malfunction. To prevent this, in the case of the dongle apparatus 10, a structure for preventing separation from a home appliance can be employed. Accordingly, the dongle apparatus 10 can include a separation preventer 100. A detailed description of the dongle apparatus 10 including the separation preventer 100 will be provided below with reference to FIG. 6.

Figure 2:
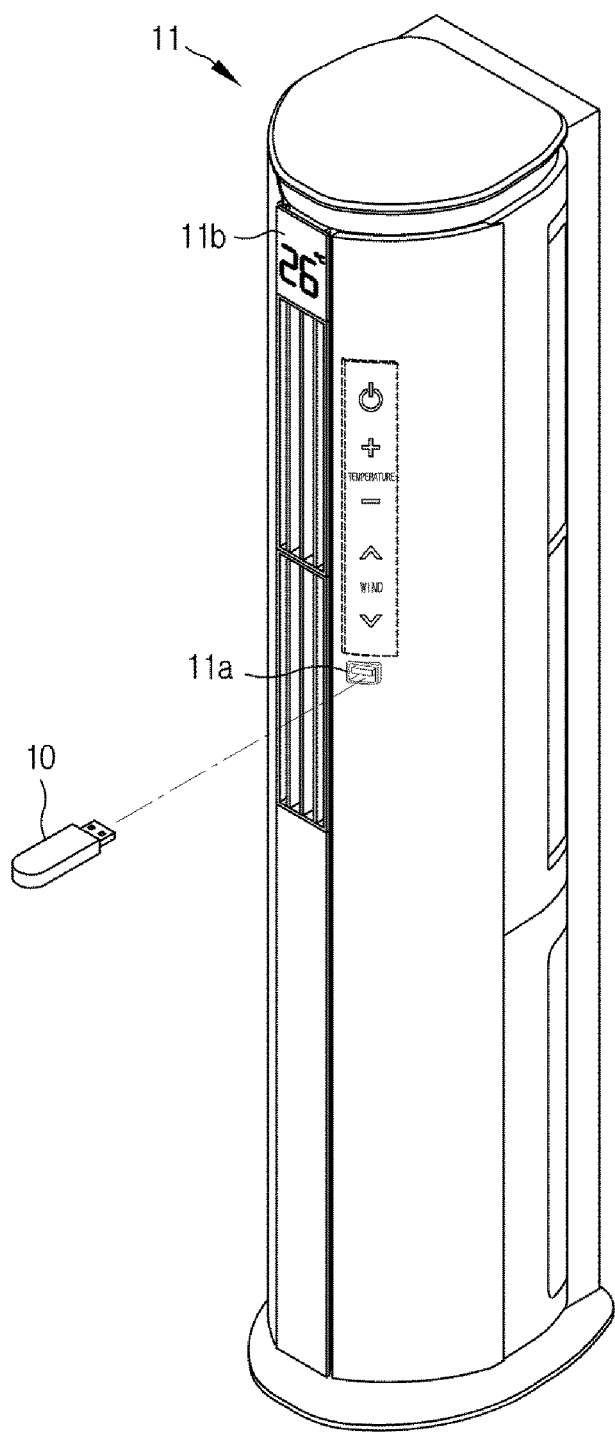
FIG. 2 is an isometric view illustrating a dongle apparatus capable of wireless communication and an air-conditioner that communicates therewith in accordance with one embodiment.

FIG. 2 is a view illustrating a dongle apparatus capable of wireless communication and an air-conditioner that communicates therewith in accordance with one embodiment.

The air-conditioner 11 is a home appliance that controls a temperature and humidity of indoor air and can include a first connection port 11a which can be physically connected to the dongle apparatus 10, a power supply (not shown) that supplies power to the dongle apparatus 10, and a display 11b that outputs several pieces of information with respect to the air-conditioner 11.

Also, the air-conditioner 11 can receive software and software update information with respect to the air-conditioner 11 from at least one of an external apparatus and an external server using a communication module in the air-conditioner 11 or the dongle apparatus 10 physically connected to the first connection port 11a of the air-conditioner 11.

The first connection port 11a of the air-conditioner 11 is a place to which the dongle apparatus 10 can be physically connected and can include the separation preventer 100.

The air-conditioner 11 can supply power when it is determined that the dongle apparatus 10 is physically connected to the air-conditioner 11 through the first connection port 11a.

The display 11b can output various pieces of information with respect to the air-conditioner 11 to a user. For example, data including product information, an operation state, and failure information of the air-conditioner 11 can be output in the form of an image or text.

Also, when the dongle apparatus 10 is physically connected to the first connection port 11a, the display 11b can display connection state information with respect thereto.

Also, when the dongle apparatus 10 is not properly connected to the first connection port 11a of the air-conditioner 11, the display 11b can output and provide information with respect thereto in the form of an image or text to the user.

Also, the display 11b can display information for checking whether the dongle apparatus 10 is normally connected to the first connection port 11a of the air-conditioner 11 and is capable of wireless communication with at least one of an external apparatus an external server.

Also, the display 11b can display operation state information with respect to the separation preventer 100 included in at least one of the dongle apparatus 10 and the first connection port 11a of the air-conditioner 11. Also, the display 11b can display state information with respect to a process of updating software of the air-conditioner 11. The display 11b can be formed of a liquid crystal panel in the form of a touch screen, and can be a means for inputting a touch of the user.

The liquid crystal panel of the display 11b can be realized by a liquid crystal display (LCD), a light emitting diode (LED), a plasma display panel (PDP), an organic light emitting diode (OLED), a cathode ray tube (CRT), and the like.

Figure 3:
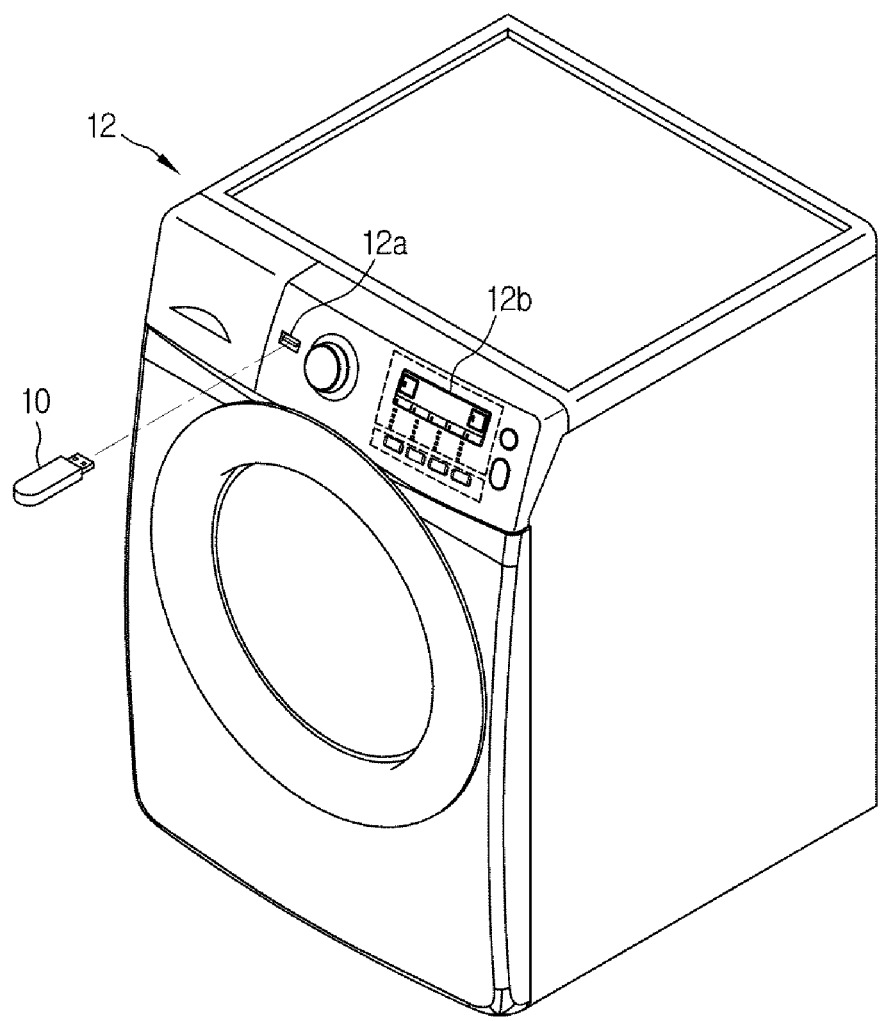
FIG. 3 is an isometric view illustrating the dongle apparatus capable of wireless communication and a washing machine that communicates therewith in accordance with one embodiment.

FIG. 3 is a view illustrating a dongle apparatus capable of wireless communication and a washing machine that communicates therewith in accordance with one embodiment.

The washing machine 12 is a home appliance that receives an electrical signal and rotates a washing tub using power of a motor, and can include a second connection port 12a which can be physically connected to the dongle apparatus 10, a power supply (not shown) that supplies power to the dongle apparatus 10, and a display 12b that outputs several pieces of information with respect to the washing machine 12. Also, the washing machine 12 can receive software and software update information with respect to the washing machine 12 from at least one of an external apparatus and an external server using a communication module in the washing machine 12 or the dongle apparatus 10 physically connected to the second connection port 12a of the washing machine 12.

The second connection port 12a of the washing machine 12 is a place to which the dongle apparatus 10 can be physically connected and can include the separation preventer 100.

The washing machine 12 can supply power when it is determined that the dongle apparatus 10 is physically connected to the washing machine 12 through the second connection port 12a.

The display 12b can output various pieces of information with respect to the washing machine 12 to a user.

For example, data including product information, an operation state, and failure information of the washing machine 12 can be output in the form of an image or text. Also, when the dongle apparatus 10 is physically connected to the second connection port 12a, the display 12b can display connection state information with respect thereto.

Also, when the dongle apparatus 10 is not properly connected to the second connection port 12a of the washing machine 12, the display 12b can output and provide information with respect thereto in the form of an image or text to the user.

Also, the display 12b can display information for checking whether the dongle apparatus 10 is normally connected to the second connection port 12a of the washing machine 12 and is capable of wirelessly communication with at least one of an external apparatus an external server.

Also, the display 12b can display operation state information with respect to the separation preventer 100 included in at least one of the dongle apparatus 10 and the second connection port 12a of the washing machine 12.

Also, the display 12b can display state information with respect to a process of updating software of the washing machine 12. The display 12b can be formed of a liquid crystal panel in the form of a touch screen, and can be a means for inputting a touch of the user.

Figure 4:
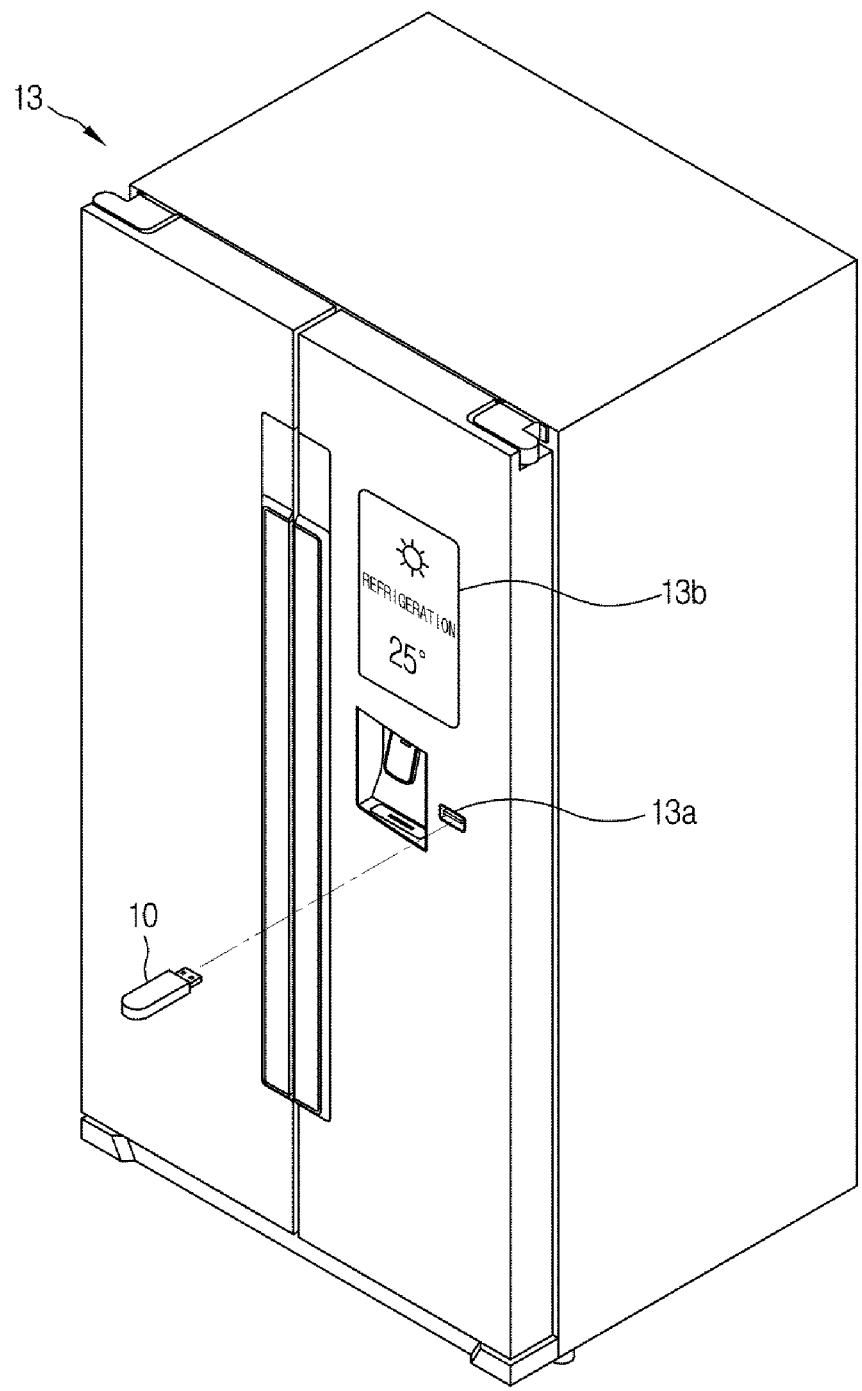
FIG. 4 is an isometric view illustrating the dongle apparatus capable of wireless communication and a refrigerator that communicates therewith in accordance with one embodiment.

FIG. 4 is a view illustrating the dongle apparatus capable of wireless communication and a refrigerator that communicates therewith in accordance with one embodiment.

The refrigerator 13 is a home appliance that keeps food refrigerated or frozen and can include a third connection port 13a which can be physically connected to the dongle apparatus 10, a power supply (not shown) that supplies power to the dongle apparatus 10, and a display 13b that outputs several pieces of information with respect to the refrigerator 13. Also, the refrigerator 13 can receive software and software update information with respect to the refrigerator 13 from at least one of an external apparatus and an external server using a communication module in the refrigerator 13 or the dongle apparatus 10 physically connected to the third connection port 13a of the refrigerator 13.

The third connection port 13a of the refrigerator 13 is a place to which the dongle apparatus 10 can be physically connected and can include the separation preventer 100.

The refrigerator 13 can supply power when it is determined that the dongle apparatus 10 is physically connected to the refrigerator 13 through the third connection port 13a.

The display 13b can output various pieces of information with respect to the refrigerator 13 to a user. For example, data including product information, an operation state, and failure information of the refrigerator 13 can be output in the form of an image or text.

Also, when the dongle apparatus 10 is physically connected to the third connection port 13a, the display 13b can display connection state information with respect thereto.

Also, when the dongle apparatus 10 is not properly connected to the third connection port 13a of the refrigerator 13, the display 13b can output and provide information with respect thereto in the form of an image or text to the user.

Also, the display 13b can display information for checking whether the dongle apparatus 10 is normally connected to the third connection port 13a of the refrigerator 13 and is capable of wireless communication with at least one of an external apparatus an external server.

Also, the display 13b can display operation state information with respect to the separation preventer 100 included in at least one of the dongle apparatus 10 and the third connection port 13a of the refrigerator 13.

Also, the display 13b can display state information with respect to a process of updating software of the refrigerator 13. The display 13b can be formed of a liquid crystal panel in the form of a touch screen and can be a means for inputting a touch of the user.

Figure 5:
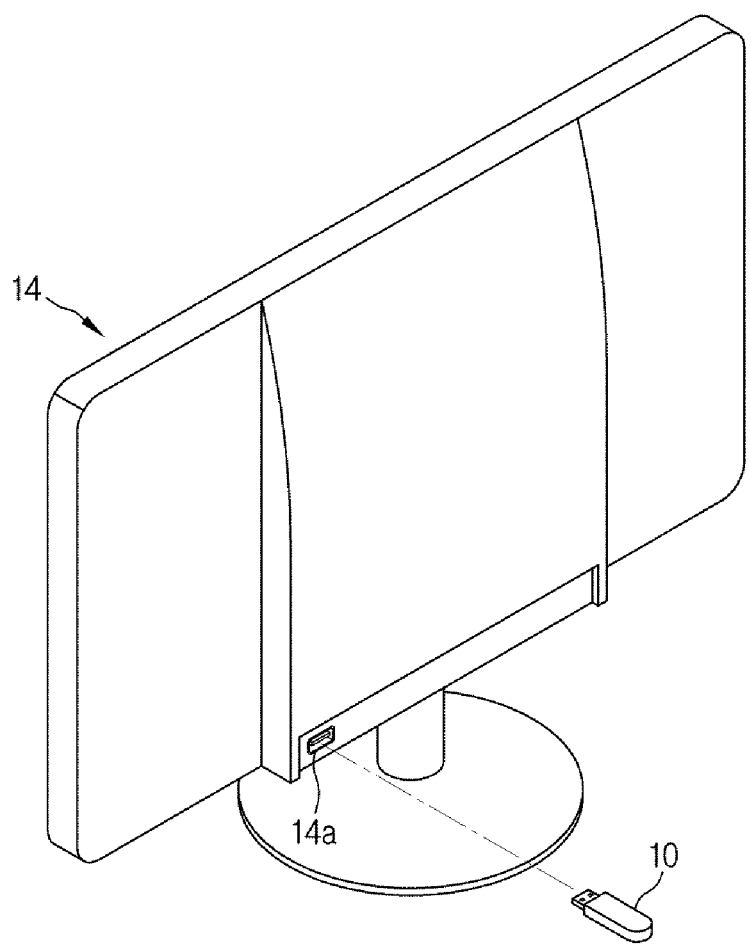
FIG. 5 is an isometric view illustrating the dongle apparatus capable of wireless communication and a television that communicates therewith in accordance with one embodiment.

FIG. 5 is a view illustrating the dongle apparatus capable of wireless communication and the TV 14 that communicates therewith in accordance with one embodiment.

The TV 14 is a home appliance that outputs a video or an image and can include a fourth connection port 14a which can be physically connected to the dongle apparatus 10, a power supply (not shown) that supplies power to the dongle apparatus 10, and a display that outputs several pieces of information with respect to the TV 14. Also, the TV 14 can receive software and software update information with respect to the TV 14 from at least one of an external apparatus and an external server using a communication module in the TV 14 or the dongle apparatus 10 physically connected to the fourth connection port 14a of the TV 14.

The fourth connection port 14a of the TV 14 is a place to which the dongle apparatus 10 can be physically connected and can include the separation preventer 100.

The TV 14 can supply power when it is determined that the dongle apparatus 10 is physically connected to the TV 14 through the fourth connection port 14*a*.

The display can output various pieces of information with respect to the TV 14 to a user. For example, data including product information, an operation state, and failure information of the TV 14 can be output in the form of an image or text.

Also, when the dongle apparatus 10 is physically connected to the fourth connection port 14*a*, the display can display connection state information with respect thereto.

Also, when the dongle apparatus 10 is not properly connected to the fourth connection port 14*a* of the TV 14, the display 11*b* can output and provide information with respect thereto in the form of an image or text to the user.

Also, the display can display information for checking whether the dongle apparatus 10 is normally connected to the fourth connection port 14*a* of the TV 14 and is capable of wireless communication with at least one of an external apparatus an external server.

Also, the display can display operation state information with respect to the separation preventer 100 included in at least one of the dongle apparatus 10 and the fourth connection port 14*a* of the TV 14.

Also, the display can display state information with respect to a process of updating software of the TV 14. The display can be formed of a liquid crystal panel in the form of a touch screen and can be a means for inputting a touch of the user.

Figure 6:
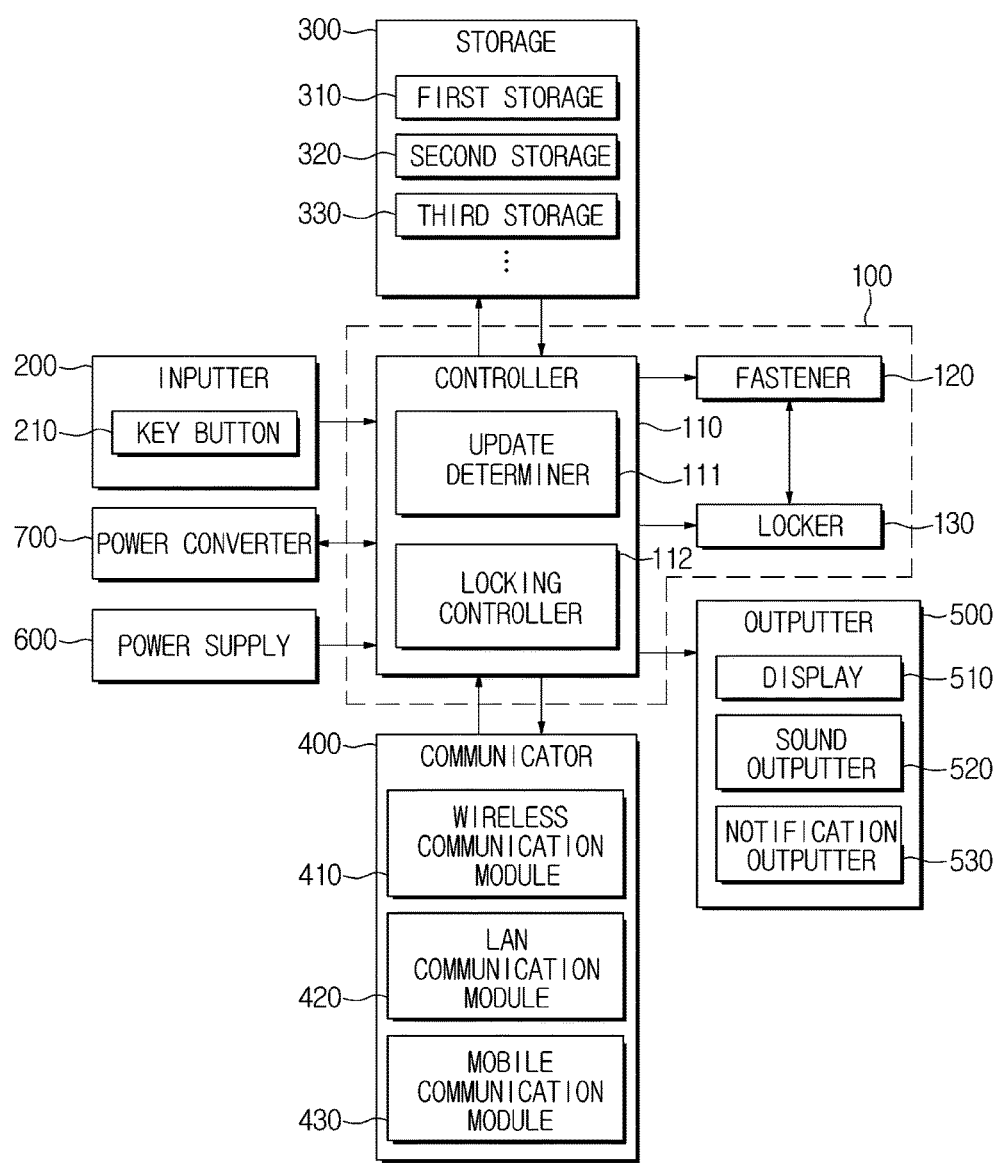
FIG. 6 is a block diagram of the dongle apparatus in accordance with one embodiment.

FIG. 6 is a configuration block diagram of the dongle apparatus in accordance with one embodiment.

The dongle apparatus 10 can include the separation preventer 100, an inputter 200, a storage 300, a communicator 400, an outputter 500, a power supply 600, and a power converter 700.

The separation preventer 100 refers to a unit including a structure configured to control a combination between a home appliance and the dongle apparatus 10 to be maintainable or separable depending on set conditions. Also, the separation preventer 100 can be included in the home appliance and the dongle apparatus 10.

In other words, the separation preventer 100 can maintain or separate the combination between the home appliance and the dongle apparatus 10 depending on the set conditions.

The separation preventer 100 described above can not only be included in at least one of the dongle apparatus 10 and the plurality of home appliances 11 to 14, but can also be included in various applicable apparatuses.

Also, the separation preventer 100 can be included in the first to fourth connection ports 11*a* to 14*a* installed in the plurality of home appliances 11 to 14.

Here, the first to fourth connection ports 11*a* to 14*a* can be generally used USB connection ports and the first to fourth connection ports 11*a* to 14*a* will be described under that assumption.

The separation preventer 100 can include a controller 110 configured to control the combination between the home appliance and the dongle apparatus 10, a fastener 120 including a plurality of fixing members, and a locker 130 configured to lock or unlock the fastener 120. However, this is a configuration for describing a separation preventing structure in the separation preventer 100, but the separation preventing structure is not limited thereto and can include more components.

The controller 110 can perform overall control with respect to respective components. The controller 110 includes a memory (not shown) configured to store algorithms for controlling operations of the components in the dongle apparatus 10 or data of programs reproducing the algorithms, and a processor (not shown) configured to perform the operations described above using the data stored in the memory. Here, the memory and the processor can be embodied as separate chips. Conversely, the memory and the processor can be embodied as a single chip.

Also, the controller 110 can receive available power from the power converter 700, can determine whether to start or finish an update of software of at least one of the home appliance and the dongle apparatus 10, and can control the locker 130 to lock or unlock the fastener 120 depending on whether an electrical control signal is transmitted between the home appliance and the dongle apparatus 10. Also, the controller 110 can receive power from the power converter 700, can control the locker 130 to lock the fastener 120 to physically combine the home appliance with the dongle apparatus 10, and can update software of the home appliance.

In detail, the controller 110 can control the locker 130 to lock the fastener 120 when it is determined that the home appliance and the dongle apparatus 10 are combined and an update of software corresponding to at least one of the home appliance and the dongle apparatus 10 is started. Here, controlling the locker 130 to lock the fastener 120 refers to electrically controlling the fastener 120 not to separate in a state in which the dongle apparatus 10 and a connection port of the home appliance are physically connected to each other when the software of the home appliance is updated.

Accordingly, it is possible to prevent the dongle apparatus 10 from being separated from the connection port of the home appliance from the start of the update of the software of the home appliance to the end using the dongle apparatus 10. A detailed description thereof will be provided below with reference to FIGS. 10 and 11.

Conversely, the controller 110 can control the locker 130 to unlock the fastener 120 when it is determined that the home appliance and the dongle apparatus 10 are combined and the update of software corresponding to at least one of the home appliance and the dongle apparatus 10 is finished. Here, controlling the locker 130 to unlock the fastener 120 refers to electrically controlling the fastener 120 to separate from the state in which the dongle apparatus 10 and the connection port of the home appliance are physically connected to each other when the update of the software of the home appliance is finished. A detailed description thereof will be provided below with reference to FIGS. 10 and 11.

Also, the controller 110 can include an update determiner 111 and a locking controller 112.

The update determiner 111 can receive available power from the power converter 700 and can determine whether the update of the software corresponding to at least one of the home appliance and the dongle apparatus 10 is started or finished. Also, the update determiner 111 can transmit information on the determined start or finish of the update of the software in an electrical signal to the locking controller 112.

The locking controller 112 can transmit a control command for locking or unlocking the fastener 120 to the locker 130 based on the information received from the update determiner 111. Subsequently, the locker 130 can lock or unlock the fastener 120 according to the control command received from the locking controller 112.

The fastener 120 refers to a part at which physical combination between the dongle apparatus 10 and the home appliance is performed. Also, the fastener 120 can be formed in at least one of the home appliance and the dongle apparatus 10, and can combine or separate the home appliance and the dongle apparatus 10 with or from each other.

Also, for convenience of description, the fastener 120 is shown as a component of the separation preventer 100, but a structure and an operation process thereof can vary depend on which apparatus the separation preventer 100 is included in.

That is, a structure and an operation process of the fastener 120 (refer to FIGS. 10A to 10D) when the separation preventer 100 is included in the dongle apparatus 10 can be different from a structure and an operation process of a fastener 122 (refer to FIGS. 11A to 11D) when the separation preventer 100 is included in the connection port of the home appliance. A detailed description of detailed structures and operation processes of the fasteners 120 and 122 described above will be provided below with reference to FIGS. 10 and 11.

The locker 130 can lock or unlock the fastener 120 not to be separated or to be separated from at least one of the home appliance and the dongle apparatus 10. A detailed description thereof will be provided below with reference to FIGS. 10 and 11.

All of the components of the separation preventer 100 described above with reference to FIG. 6 can be identically included regardless of which apparatus or device the separation preventer 100 is included in.

That is, the components of the separation preventer 100 of FIG. 6 can be identically included in the dongle apparatus 10, can be included in one of the first to fourth connection ports 11a to 14a of the plurality of home appliances 11 to 14, or can be included in the plurality of home appliances 11 to 14. The components and operations of the separation preventer 100 included in the respective apparatuses are identical and will be omitted to avoid redundant description.

The inputter 200 can include a key button 210 that is a means that allows the user to input various commands with respect to the dongle apparatus 10. Also, the inputter 200 can include a hardware device such as various buttons or switches, a pedal, a keyboard, a mouse, a trackball, various levers, a handle, a stick, or the like for an input of the user.

Also, the inputter 200 can include a graphical user interface (GUI) such as a touch pad and the like, that is, a software device for a user input. The touch pad can be realized as a touch screen panel (TSP) to form a mutually layered structure with the display.

When the touch panel is formed of the TSP forming the mutually layered structure with the touch pad, the touch panel can be used as the inputter.

The user can input various control commands with respect to the dongle apparatus 10 through the key button 210 that exists at an exterior of the dongle apparatus 10.

For example, under the assumption of a state in which the dongle apparatus 10 is connected to the connection port of the home appliance when the key button 210 is pushed short, it is possible to execute a command for detecting a Wi-Fi™ communication signal or a Bluetooth™ communication signal to enter into a state in which wireless communication is enabled.

Also, when the key button 210 is pushed for a long time, it is possible to manually operate the dongle apparatus not to be separated from the connection port of the home appliance, that is, to lock the fastener 120. As described above, the user can set to perform various functions through the inputter 200.

The storage 300 can store information with respect to various settings of the dongle apparatus 10. Also, while the dongle apparatus 10 is connected to the connection port of the home appliance, it is possible to store update information with respect to software of the connected home appliance.

The storage 300 can include a first storage 310, a second storage 320, and a third storage 330. As described above, since the storage 300 includes a plurality of storages to store update information with respect to the home appliances in the respective storages, the plurality of home appliances can be updated using only one dongle apparatus 10.

The storage 300 can be embodied as at least one of a nonvolatile memory device such as a cache, a read-only memory (ROM), an erasable programmable ROM (EPROM), an electrically EPROM (EEPROM), and a flash memory, a volatile memory such as random-access memory (RAM), and a storage medium such as a hard disk drive (HDD) and a compact disc ROM (CD-ROM), but the storage 300 is not limited thereto. The storage 300 can be a memory realized as a chip separate from the processor described above with respect to the controller 110, and can be a single chip integrated with the processor.

The communicator 400 can transmit and receive data with at least one of the external apparatus and the external server. Also, the communicator 400 can include at least one component capable of communicating with the external apparatus. For example, the communicator 400 can include a wireless communication module 410, a local network area (LAN) communication module 420, and a mobile communication module 430.

The wireless communication module 410 refers to a module for accessing the Internet wirelessly. In addition to a Wi-Fi module and a wireless broadband module, the wireless communication module 410 configured for various wireless communication methods such as a global system for mobile communication (GSM), code division multiple access (CDMA), wideband CDMA (WCDMA), universal mobile telecommunication system (UMTS), time division multiple access (TDMA), long term evolution (LTE), and the like can be included.

The LAN communication module 420 refers to a module for LAN communication. For example, the LAN communication module 420 can include various LAN communication modules that transmit and receive signals using a close range wireless communication network such as a Bluetooth™ module, an IR communication module, a radio frequency identification (RFID) communication module, a wireless LAN (WLAN) communication module, a near field communication (NFC) module, a Zigbee™ communication module, and the like.

The mobile communication module 430 can transmit and receive wireless signals with at least one of a base station, an external terminal, and a server over a wireless communication network.

Also, a wired communication module (not shown) can include not only various wired communication modules such as a LAN module, a wide area network (WAN) module, a value added network (VAN) module, and the like, but also various cable communication modules such as a USB, a high definition multimedia interface (HDMI), a digital visual interface (DVI), a recommended standard 232 (RS-232), a power cable communication, a plain old telephone service, and the like.

The dongle apparatus 10 can wirelessly communicate with at least one of the external apparatus and the external server using the communicator 400. Also, when the dongle apparatus 10 is connected to the connection port of the home appliance, the software of the home appliance can be updated using update information of the home appliance received through the communicator 400.

The outputter 500 can include a display 510, a sound outputter 520, and a notification outputter 530, and can output various pieces of information to the user.

For example, when the dongle apparatus 10 and the connection port of the home appliance are physically combined, the outputter 500 can output lock or unlock state information of the fastener 120. Also, the outputter 500 can output information that indicates whether the dongle apparatus 10 and the connection port of the home appliance are physically combined to be capable of wireless communication.

The display 510 can output the various pieces of information described above in the form of image data.

The display 510 can be provided as a CRT, a digital light processing (DLP) panel, a PDP, an LCD panel, an electroluminescence (EL) panel, an electrophoretic display (EPD) panel, an electrochromic display (ECD) panel, an LED panel, an OLED panel, or the like but is not limited thereto.

The sound outputter 520 can output the various pieces of information described above in the form of sound data. For example, when a physical combination between the dongle apparatus 10 and the connection port of the home appliance is not properly performed, the sound outputter 520 can output an alarm sound to notify the user.

When the physical combination between the dongle apparatus 10 and the connection port of the home appliance is normally performed to be capable of wireless communication or when an update of software of the home appliance is started or finished, the notification outputter 530 can output a notification sound that notifies the user.

The power supply 600 can receive at least one of a plurality of ranges of power from the home appliance. Generally, the dongle apparatus 10 receives power supplied from the home appliance when the dongle apparatus 10 is connected to the home appliance through a physical connection port (for example, a USB connection port).

Here, the at least one of the plurality of ranges of power from the home appliance can include at least one range of power of 4.5 V to 16 V. However, this is merely an example and power supplied according to a design of the home appliance or user settings is not limited to the range described above.

Also, when the dongle apparatus 10 independently includes a battery, power can be supplied from the battery.

The power converter 700 can convert the at least one range of power supplied from the home appliance into available power. Also, the power converter 700 can include a direct current (DC)-DC converter that receives and converts DC power into another DC power.

In detail, the DC-DC converter can receive and convert DC power with a low voltage into alternating current (AC) power and can transform and rectify the AC power into DC power with a higher voltage.

Generally, the dongle apparatus 10 uses 3.3 V or 5 V as the available power for controlling the controller 110. Accordingly, although any range of power from 4.5 V to 17 V is received from the home appliance, the power converter 700 can convert the power into the available power of 3.3 V or 5 V for the controller 110. However, the power range of 4.5 V to 17 V is an example of power supplied from the home appliance and can vary depending on home appliances.

As described above, referring to FIG. 6, the dongle apparatus 10 that converts supplied power into available power regardless of the range of power supplied from the home appliance and includes the separation preventer 100 configured to prevent a combined state from being separated when the dongle apparatus 10 is combined with the home appliance has been described.

However, the separation preventer 100 has been described as being a unit including a separation preventing structure above and being included in not only the dongle apparatus 10 but also the home appliance above. Accordingly, all of the above description with respect to the separation preventer 100 can be applied to not only the dongle apparatus 10 but also the home appliance.

Figure 7:
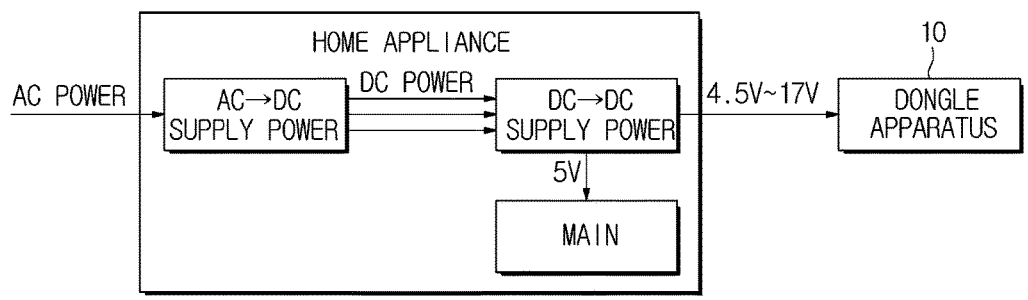
FIGS. 7 and 8 are block diagrams illustrating power conversion between the dongle apparatus and a home appliance in accordance with other embodiments.
Figure 8:
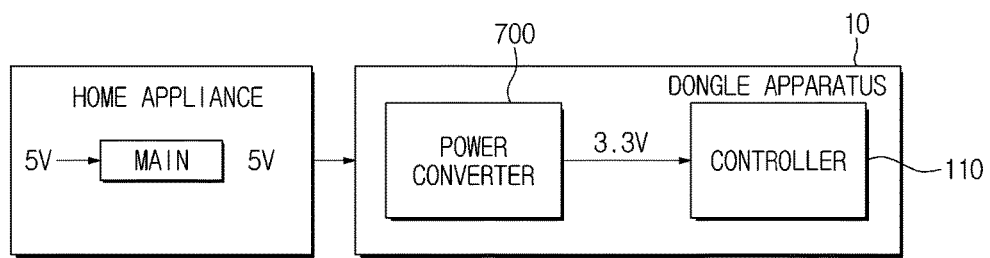
Figure 8:
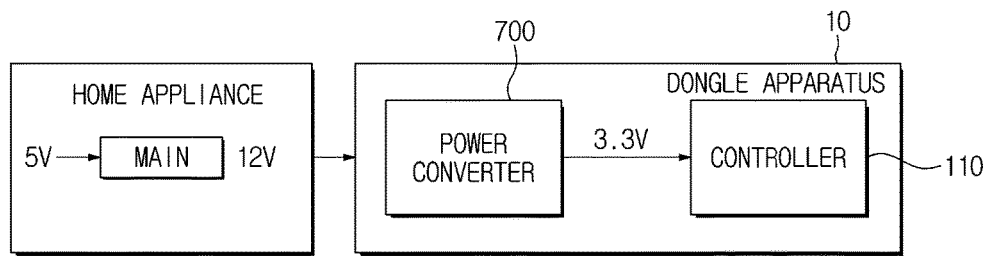

FIGS. 7 and 8 are views illustrating power conversion between the dongle apparatus and a home appliance in accordance with one embodiment.

Referring to FIG. 7, the home appliance can receive AC power supplied from the outside and can convert the AC power into DC power using an AC-DC converter.

Also, the home appliance can convert the DC power into 5 V of DC power through the DC-DC converter, and can supply the 5 V of DC power to a controller MAIN (refer to FIG. 7) of the home appliance.

Also, the home appliance can supply power to the dongle apparatus 10 through the connection port. As described above, various ranges of power from 4.5 V to 17 V can be supplied by the home appliance. This is because home appliances can be designed differently in each production year or by each manufacturer. Accordingly, the power supplied by the home appliance can vary.

As shown in FIG. 7, the range of power supplied from the home appliance to the dongle apparatus 10 can be from 4.5 V to 17 V.

Referring to FIG. 8, although receiving 5 V of power from the home appliance, the power converter 700 of the dongle apparatus 10 can convert the 5 V of power supplied from the home appliance into 3.3 V of power, which is available power for the controller 110.

Also, although 12 V of power is received from the home appliance, the power converter of the dongle apparatus 10 can convert the 12 V of power supplied from the home appliance into 3.3 V of power, which is the available power for the controller 110.

It is assumed that 5 V or 12 V of power is supplied to the home appliance. As described above, even though any range of power within the range from 4.5 V to 17 V is supplied, the dongle apparatus 10 can convert the power into the available power of 3.3 V for the controller 110 through the power converter 700. However, although described above, since the available power of the controller 110 is 3.3 V or 5 V, the controller 110 of the dongle apparatus 10 can receive the available power obtained by conversion, and can control the locker 130 to lock or unlock the fastener 120.

Figure 9:
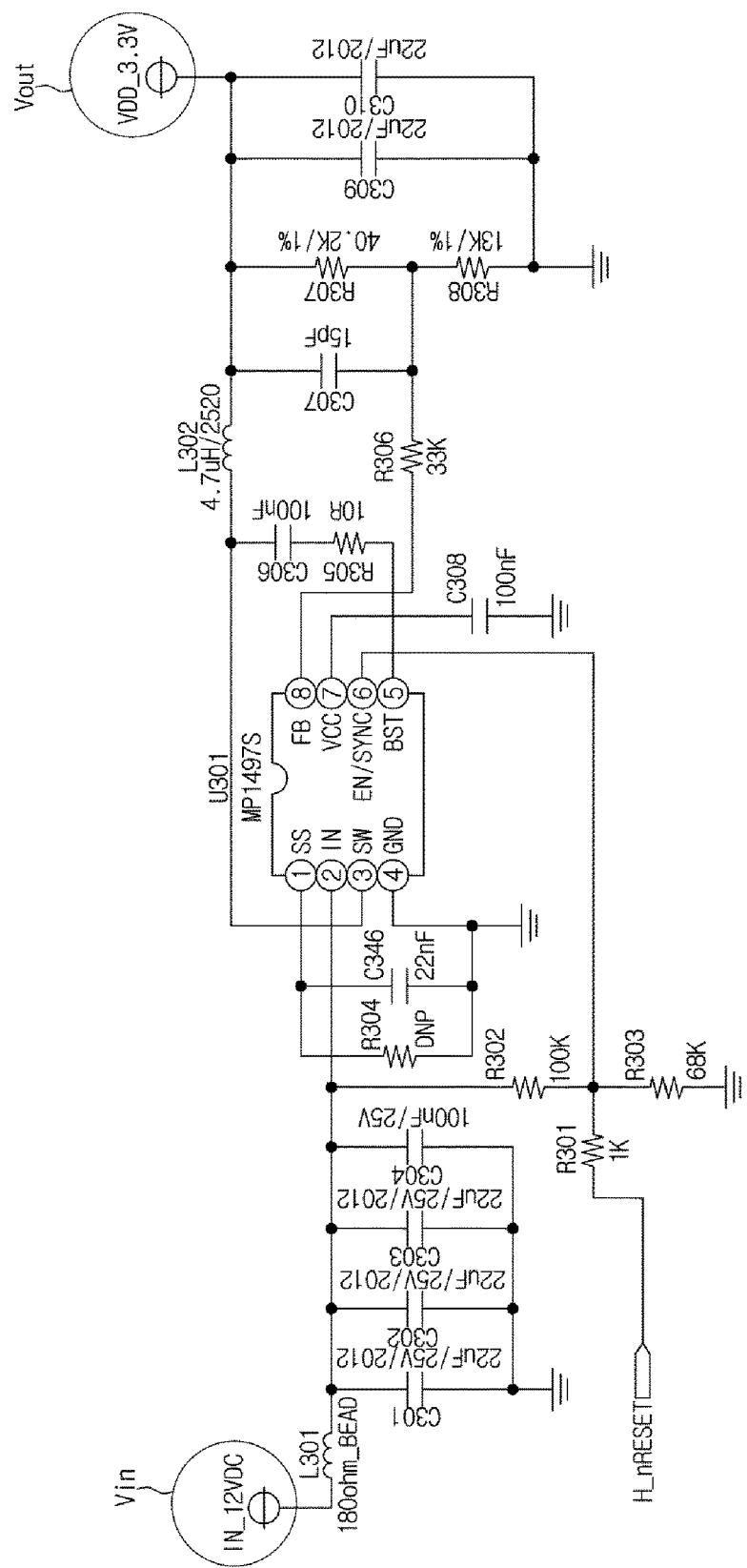
FIG. 9 is a circuit view illustrating an example of a power converter included in the dongle apparatus in accordance with one embodiment.

FIG. 9 is a view illustrating an example of the power converter included in the dongle apparatus in accordance with one embodiment.

The power converter 700 can include the DC-DC converter that receives and converts DC power into DC power. Since FIG. 9 illustrates a circuit diagram of a DC-DC converter MP1497 of Monolithic Power Systems company and it is well-known in the art, a detailed description thereof will be omitted.

Also, the power converter 700 can convert the power supplied from the home appliance into the available power. That is, the power converter 700 can receive and convert DC power supplied from the home appliance into 3.3 V of DC power. Referring to FIG. 9, a circuit diagram of the DC-DC converter included in the power converter 700 is shown. When 12 V is input as input power Vin, the 12 V input power Vin is converted into and output as 3.3 V output power Vout. However, this is an example and the present disclosure is not limited thereto.

FIGS. 10A to 10D are views illustrating an operation process of a separation preventer included in the dongle apparatus in accordance with one embodiment.

In detail, FIG. 10A to 10D illustrate an operation process of the separation preventer 100 when the dongle apparatus 10 including the separation preventer 100 is physically combined with one of the first to fourth connection ports 11a to 14a of the plurality of home appliances 11 to 14. Hereinafter, the operation process of the separation preventer 100 will be described in detail and a redundant description that is provided above will be omitted. Also, the operation process will be described under the assumption that the dongle apparatus 10 receives and converts power from the home appliance into available power and is controlled using the available power.

A user can connect the dongle apparatus 10 to one of the first to fourth connection ports 11a to 14a of the plurality of home appliances 11 to 14 to update software of the home appliance through wireless communication. Referring to FIG. 10A, the dongle apparatus 10 can include the separation preventer 100. The separation preventer 100 can include the fastener 120 and the locker 130.

The fastener 120 can include two first fixers 121a (refer to FIGS. 10A to 10D) spaced apart from each other and having a groove 121c (refer to FIGS. 10A to 10D) formed therebetween, and a second fixer inserted into the groove 121c between the two first fixers 121a to fix the two first fixers 121a.

The locker 130 can be physically connected to the second fixer 121b of the fastener 120 and can move the second fixer 121b of the fastener 120 using an internal motor when a control command with respect to locking and unlocking operations is received from the controller 110. That is, since the locker 130 receives an electrical control signal and operates a machine using power, the locker 130 can be referred to as an actuator.

Referring to FIGS. 10A to 10D, the user can physically combine the dongle apparatus 10 with at least one of the first to fourth connection ports 11a to 14a of the plurality of home appliances 11 to 14 (refer to FIG. 10A). As described above, when the physical combination is finished by the user, the controller 110 of the separation preventer 100 can determine a physical combination state between the dongle apparatus 10 and the at least one of the first to fourth connection ports 11a to 14a of the plurality of home appliances 11 to 14.

In detail, the controller 110 can determine whether the two apparatuses are properly combined by checking whether the dongle apparatus 10 is connected to at least one of the first to fourth connection ports 11a to 14a of the plurality of home appliances 11 to 14 by the user and normally receives power from a power supply (not shown) of the home appliance. That is, the controller 110 can determine whether the physical combination between the two apparatuses is normally performed by checking whether the dongle apparatus 10 normally receives the power from the home appliance. Determination information of the controller 110 described above can be defined as power supply state information.

Also, the controller 110 can determine whether the two apparatuses are properly combined by checking whether the dongle apparatus 10 is connected to at least one of the first to fourth connection ports 11a to 14a of the plurality of home appliances 11 to 14 by the user and wirelessly communicates with at least one of an external apparatus and an external server. That is, the controller 110 can determine whether the physical combination between the two apparatuses is normally performed by checking whether the home appliance normally performs wireless communication through the dongle apparatus 10. The determination information of the controller 110 described above can be defined as wireless communication possibility information.

Also, the controller 110 can determine whether the two apparatuses are physically combined by using both the power supply state information and the wireless communication possibility information described above.

Subsequently, the controller 110 can determine whether an update of software corresponding to at least one of the dongle apparatus 10 and the plurality of home appliances 11 to 14 is started or finished through the update determiner 111 under the assumption of a state in which the two apparatuses are physically combined.

When it is determined that a physical connection between the dongle apparatus 10 and the connection port of the home appliance is normally performed and the update of the software is started, the controller 110 can control the locker 130 to lock the fastener 120 through the locking controller 112.

Here, controlling the locker 130 to lock the fastener 120 refers to receiving an electrical control signal from the controller 110 and physically moving the second fixer 121b to the groove 121c between the two spaced apart first fixers 121a. In this case, a space for allowing the first fixer 121a to move is necessary for separating a combination of the two apparatuses. The second fixer 121b is inserted into the groove 121c between the two first fixers 121a and fixes the first fixer 121a to be immobile. Accordingly, the two apparatuses are not separated from each other (refer to FIG. 10B).

Subsequently, when it is determined that the physical connection between the dongle apparatus 10 and the connection port of the home appliance is normally performed and the update of the software is finished, the controller 110 can control the locker 130 to unlock the fastener 120 through the locking controller 112.

Here, controlling the locker 130 to unlock the fastener 120 refers to receiving an electrical control signal from the controller 110 and physically moving the second fixer 121b inserted in the groove 121c between the two spaced apart first fixers 121a to an original position thereof to separate the combination between the two apparatuses (refer to FIG. 10C).

Accordingly, when the fastener 120 is in an unlocked state, since the groove 121c, which is a space between the first fixers 121a, is formed, the first fixers 121a are spaced apart from each other at both sides. Due to this, the user can easily separate the dongle apparatus 10 from the first to fourth connection ports 11a to 14a of the home appliances 11 to 14 by applying a physical force thereto (refer to FIG. 10D).

FIGS. 11A to 11D are views illustrating an operation process of a separation preventer included in the home appliance in accordance with one embodiment.

Unlike FIGS. 10A to 10D, FIG. 11A to 11D illustrates a case in which the separation preventer 100 is included in the first to fourth connection ports 11a to 14a of the plurality of home appliances 11 to 14. Here, the operation process of the separation preventer 100 in the home appliance will be described with reference to FIGS. 11A to 11D.

Each of the first to fourth connection ports 11a to 14a of the home appliances 11 to 14 can include the fastener 122 and a locker 132. Here, the fastener 122 and the locker 132 have the same functions as those of the fastener 120 and the locker 130 in the dongle apparatus 10 including the separation preventer 100 described above, but have different structures therefrom. The structures will be described in detail.

The fastener 122 can include two third fixers 122a and 122b having a groove formed therebetween and a fourth fixer 122d connected to exteriors of the two third fixers 122a and 122b to fix the two third fixers 122a and 122b not to separate from each other.

The user can physically combine the dongle apparatus 10 with at least one of the first to fourth connection ports 11a to 14a of the plurality of home appliances 11 to 14 including the separation preventer 100 (refer to FIG. 11A).

As described above, when the physical combination is finished by the user, the controller 110 in the separation preventer 100 can determine a physical combination state between the dongle apparatus 10 and at least one of the first to fourth connection ports 11a to 14a of the plurality of home appliances 11 to 14. Since the method of determining the physical combination has been described with reference to FIG. 10, it will be omitted.

Subsequently, assuming a state in which the two apparatuses are physically combined, the controller 110 can determine whether an update of software corresponding to at least one of the dongle apparatus 10 and the plurality of home appliances 11 to 14 is started or finished through the update determiner 111.

When it is determined that the physical connection between the dongle apparatus 10 and the connection port of the home appliance is normally performed and the update of the software is started, the controller 110 can control the locker 132 to lock the fastener 122 through the locking controller 112.

Here, controlling the locker 132 to lock the fastener 122 refers to receiving an electrical control signal from the controller 110, physically moving the fourth fixer 122d connected to the locker 132 toward the two third fixers 122a and 122b, and fixing the third fixers 122a and 122b not to separate from two spaced apart grooves 123a and 123b by the user and present in a connector 122c of the dongle apparatus 10 when the two third fixers 122a and 122b are physically connected to the two grooves 123a and 123b while being inserted therein. In this case, since the third fixers 122a and 122b are fixed to be immobile, the combination between the two apparatuses is not separated (refer to FIG. 11C).

Subsequently, when it is determined that the physical connection between the dongle apparatus 10 and the connection port of the home appliance is normally performed and the update of the software is finished, the controller 110 can control the locker 132 to unlock the fastener 122 through the locking controller 112.

Here, controlling the locker 132 to unlock the fastener 122 refers to receiving an electrical control signal from the controller 110 and controlling the two third fixers 122a and 122b to be easily separated from the two grooves 123a and 123b of the dongle apparatus 10 by moving the fourth fixer 122d connected to the locker 132 to an original position thereof (refer to FIG. 11D).

Figure 12:
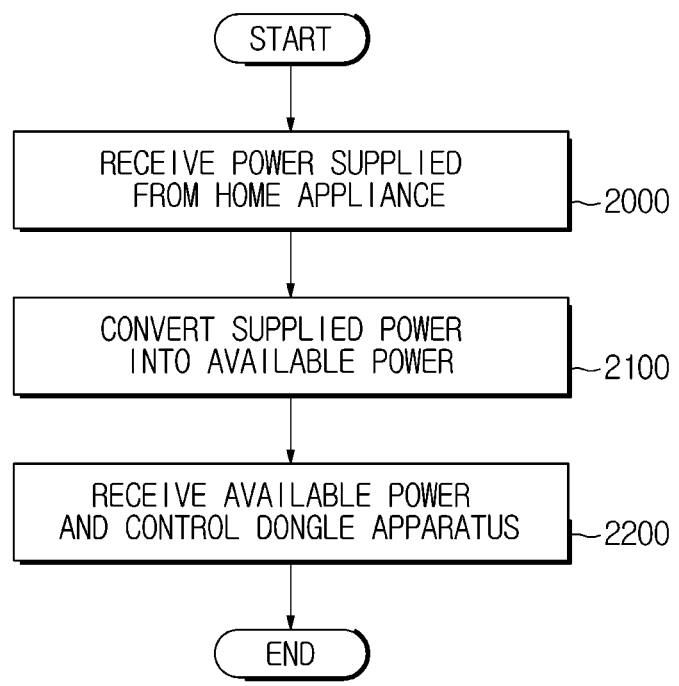
FIG. 12 is a flowchart illustrating a power conversion process of the dongle apparatus in accordance with one embodiment.

FIG. 12 is a flowchart illustrating a power conversion process of the dongle apparatus in accordance with one embodiment.

The dongle apparatus 10 can be connected to a home appliance through a connection port of the home appliance. In detail, the dongle apparatus 10 and the home appliance can be combined through the fastener 120.

When the dongle apparatus 10 is connected to the home appliance, the dongle apparatus 10 can receive at least one of a plurality of ranges of power from a power supply of the home appliance (2000).

Here, the plurality of ranges of power can be 4.5 V to 17 V. The plurality of ranges of power can vary depending on supplied power designed when the home appliance is designed. However, the plurality of ranges is an example and wider ranges can be provided.

The dongle apparatus 10 can convert supplied power received from the home appliance into available power for the controller 110 (2100).

In detail, since the available power of the controller 110 is 3.3 V or 5 V, when at least one range of power from 4.5 V to 17 V is supplied from the home appliance, the dongle apparatus 10 can convert the power into the available power through the power converter 700. Accordingly, even though any range of power is supplied from the home appliance, the dongle apparatus 10 can convert the power into the available power.

The controller 110 of the dongle apparatus 10 can receive the available power supplied from the power converter 700 and can control each component of the dongle apparatus 10 (2200).

In detail, the controller 110 can receive the available power from the power converter 700 and can control the fastener 120 to lock or unlock.

A locking and unlocking process of the dongle apparatus 10 will be described in detail with reference to FIG. 13.

Figure 13:
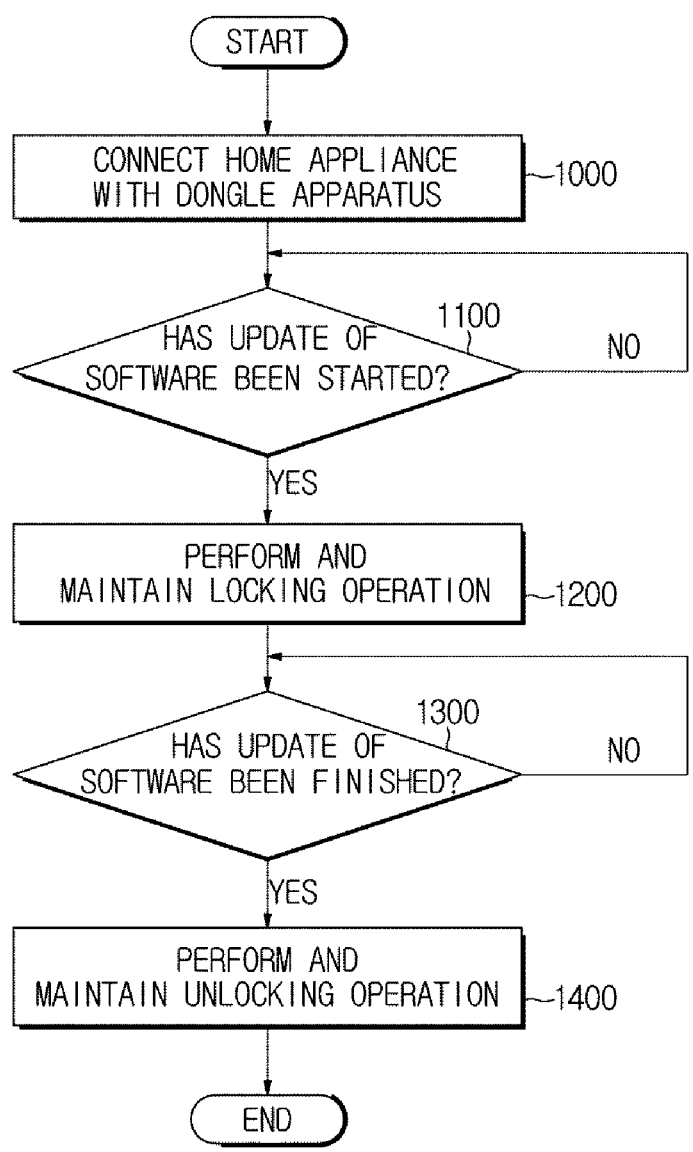
FIG. 13 is a flowchart illustrating operations of a locking and unlocking process of the dongle apparatus in accordance with one embodiment.

FIG. 13 is a flowchart illustrating operations of a locking and unlocking process of the dongle apparatus in accordance with one embodiment.

A user can connect the dongle apparatus 10 to a connection port of at least one of the first to fourth connection ports 11a to 14a of the plurality of home appliances 11 to 14 to update software of the home appliance, and can separate the dongle apparatus 10 from the connection port when the update of the software of the home appliance is finished. This corresponds to an operation of combining or separating at least two apparatuses using a fastener combined with at least one of the at least two apparatuses.

In a state in which the at least two apparatuses are combined by the user, the controller 110 can determine whether a software update of the at least two apparatuses is started or finished using the update determiner 111.

As a result of the determination of the controller 110, when it is determined that a physical combination with two apparatuses is normally performed and the software update of the home appliance is started (YES in 1100), the controller 110 prevents separation of the dongle apparatus 10 by controlling the locker 130 to lock the fastener 120 through the locking controller 112 (1200).

However, when the physical combination with the two apparatuses is normally performed but the software update of the home appliance has not started (NO in 1100), an unlocked state of the fastener 120 is maintained not to allow the separation preventer 100 to operate until the software update of the home appliance is started.

As a result of the determination of the controller 110, when it is determined that the physical combination with the two apparatuses is normally performed and the software update of the home appliance is finished (YES in 1300), the controller 110 maintains a separable state of the dongle apparatus 10 by controlling the locker 130 to unlock the fastener 120 through the locking controller 112 (1400).

As a result of the determination of the controller 110, when it is determined that the physical combination with the two apparatuses is normally performed and the software update of the home appliance has not finished (NO in 1300), the separation of the dongle apparatus 10 is prevented by maintaining a locked state of the fastener 120 until the software update of the home appliance is finished. This corresponds to an operation of locking or unlocking the fastener not to or to separate from at least one of at least two apparatuses based on whether the update is started or finished the fastener.

As described above throughout the specification, a separation preventer configured to electrically control a combination between two apparatuses not to be separated depending on whether an update is started or finished when a dongle apparatus for transmitting and receiving data with at least one of an external apparatus and an external server is physically connected to a home appliance, a dongle apparatus including the separation preventer, a home appliance including the separation preventer, and a method of controlling the separation preventer have been described.

As should be apparent from the above description, a dongle apparatus and a method of controlling the same in accordance with one embodiment of the present disclosure can convert power supplied from a home appliance into available power regardless of a range thereof to update software of the home appliance or to allow the home appliance to communicate with an external apparatus.

Also, according to the dongle apparatus and the method of controlling the same, when the dongle apparatus is physically combined with the home appliance to transmit and receive data with at least one of an external apparatus and an external server, the combination between the home appliance and the dongle apparatus is not detachable or detachable depending on whether the update is started or finished, thereby performing a more stable update.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A dongle apparatus comprising:
    a fastener configured to be combined with or separated from a home appliance;
    a locker configured to lock the fastener so that the fastener does not separate from the home appliance and unlock the fastener to separate fastener from the home appliance;
    a power supply configured to receive power supplied from the home appliance when the fastener is combined with the home appliance;
    a power converter configured to convert the power into available power; and
    a controller configured to:
        receive the available power from the power converter,
        determine whether an update of software of at least one of the home appliance and the dongle apparatus is started or finished by receiving the available power, and
        control locking and unlocking between the locker and the fastener depending on whether the update of software is started or finished.

2. The dongle apparatus of claim 1, wherein the power supply is configured to receive power from at least one power source having a preset range.

3. The dongle apparatus of claim 2, wherein the preset range comprises a range from 4.5 V to 16 V.

4. The dongle apparatus of claim 1, wherein the available power comprises 3.3 V.

5. The dongle apparatus of claim 1, wherein the power converter comprises a direct current (DC)-DC converter configured to receive and convert DC power into another DC power.

6. The dongle apparatus of claim 1, wherein the fastener comprises:
    two first fixers that are spaced apart from each other and have a groove formed therebetween; and
    a second fixer located in the groove between the two first fixers and configured to fix the two first fixers relative to each other.

7. The dongle apparatus of claim 6, wherein the controller is configured to control the locker to lock the fastener when it is determined that the home appliance and the dongle apparatus are combined and an update of software corresponding to at least one of the home appliance and the dongle apparatus is started.

8. The dongle apparatus of claim 7, wherein control of the locker to lock the fastener comprises receiving an electrical control signal from the controller and moving the second fixer in the groove between the two first fixers so that the home appliance and the dongle apparatus do not separate.

9. The dongle apparatus of claim 6, wherein the controller is configured to control the locker to unlock the fastener when it is determined that the home appliance and the dongle apparatus are combined and an update of software corresponding to at least one of the home appliance and the dongle apparatus is finished.

10. The dongle apparatus of claim 9, wherein control of the locker to unlock the fastener comprises receiving an electrical control signal from the controller and moving the second fixer in the groove between the two first fixers to an original position thereof to separate the home appliance and the dongle apparatus.

11. A method of controlling a dongle apparatus, comprising:
    receiving a connection to a home appliance through a fastener;
    receiving power from the home appliance;
    converting at least one of a plurality of ranges of power into available power;
    receiving the available power,
    determining whether an update of software of at least one of the home appliance and the dongle apparatus is started or finished by receiving the available power, and
    locking and unlocking the fastener depending on whether the update of software is started or finished.

12. The method of claim 11, wherein receiving power comprises receiving power from at least one power source having a range from 4.5 V to 16 V.

13. The method of claim 11, wherein the available power comprises 3.3 V power.

14. The method of claim 11, wherein converting at least one of the plurality of ranges of power into available power comprises converting power into available power using a direct current (DC)-DC converter configured to receive and convert DC power into another DC power.

15. The method of claim 11, wherein the fastener comprises:
    two first fixers that are spaced apart from each other and have a groove formed therebetween; and
    a second fixer located in the groove between the two first fixers to fix the two first fixers relative to each other.

16. The method of claim 15, wherein the locking the fastener comprises:

determining whether an update of software corresponding to at least one of the home appliance and the dongle apparatus is started; and locking the fastener when it is determined that the update of the software is started.

17. The method of claim 16, wherein locking the fastener comprises moving the second fixer in the groove between the two first fixers so that the home appliance and the dongle apparatus do not separate.

18. The method of claim 15, wherein the unlocking comprises:

determining whether an update of software corresponding to at least one of the home appliance and the dongle apparatus is finished; and unlocking the fastener when it is determined that the update of the software is finished.

19. The method of claim 18, wherein unlocking the fastener comprises moving the second fixer in the groove between the two first fixers to an original position thereof to separate the home appliance and the dongle apparatus.

* * * * *